United States Patent [19]
Menke

[11] Patent Number: 5,414,679
[45] Date of Patent: May 9, 1995

[54] DISC PLAYER HAVING A TRANSPORTING DEVICE FOR MOVING A DISC AND DISC HOLDER

[75] Inventor: Wilhelm Menke, Ingelheim, Germany

[73] Assignee: NSM Aktiengesellschaft, Bingen, Germany

[21] Appl. No.: 94,014

[22] PCT Filed: Jan. 16, 1992

[86] PCT No.: PCT/DE92/00027
§ 371 Date: Jul. 22, 1993
§ 102(e) Date: Jul. 22, 1993

[87] PCT Pub. No.: WO93/13343
PCT Pub. Date: Aug. 6, 1992

[30] Foreign Application Priority Data
Jan. 22, 1991 [DE] Germany ............ 41 01 693.9

[51] Int. Cl.⁶ ............... G11B 17/22; G11B 17/08; G11B 33/02
[52] U.S. Cl. ............. 369/36; 369/191; 369/192
[58] Field of Search .......... 369/36, 34, 39, 191, 369/192, 75.2; 360/98.06, 92

[56] References Cited

U.S. PATENT DOCUMENTS
4,685,095 8/1987 Rudy et al. ............ 369/36
5,197,057 3/1993 Iyama et al. .......... 369/75.1

FOREIGN PATENT DOCUMENTS
3818502A1 3/1989 Germany .
3922721A1 4/1990 Germany .
60-224144 11/1985 Japan .

*Primary Examiner*—Stuart S. Levy
*Assistant Examiner*—William R. Korzuch
*Attorney, Agent, or Firm*—Spencer, Frank & Schneider

[57] ABSTRACT

A disc player has a playback unit that includes a turntable having a driveshaft. At least one disc storage magazine having a plurality of storage compartments and a plurality of superposed disc holders stored therein is provided. Each disc holder accommodates one disc. Also provided is a transporting device movable in a direction towards the disc storage magazine for moving a desired disc and respective disc holder back and forth between the storage compartment and the playback unit. The transporting device includes a horizontally displaceable extraction device for extracting the respective disc holder. The transporting device also has a disc hold-down member for pressing the desired disc to be played onto the turntable. Further, the transporting device includes a movable carrying arm for accommodating the respective disc holder. The movable carrying arm has an upper face including a cover for gripping over the respective disc holder and disc therein. The cover has an opening essentially coaxial with a longitudinal axis of the drive shaft. The disc hold-down member is insertable into the opening.

16 Claims, 10 Drawing Sheets

DISC PLAYER HAVING A TRANSPORTING DEVICE FOR MOVING A DISC AND DISC HOLDER

BACKGROUND OF THE INVENTION

The invention relates to a disc player having at least one disc storage magazine in which a plurality of superposed disc holders each holding one disc are stored in storage compartments, the disc player further including a transporting device which is movable in the stacking direction of the disc storage magazine to move a desired disc back and forth together with the associated disc holder between the storage compartment and a playback unit. The transporting device is provided with a disc holder extraction device which is horizontally displaceable on the transporting device, a disc holddown member for holding the disc to be played against the turntable of the playback unit and a carrying arm for accommodating a disc holder.

Such a disc player is known from DE 3,922,721.A1. Here the carrying arm of the transporting device is configured in the shape of a U in order to accommodate a disc holder with a disc deposited therein. The extraction device of the transporting device transports the disc holder holding the selected disc on appropriately arranged carrying rails on the upper face of the carrying arm. In the final position of the disc holder on the carrying arm, in which the disc is concentric with the turntable of the playback unit, the disc holder as well as the disc are not protected, on the one hand, against soiling and, on the other hand, against improper access. If no disc is being played, the carrying arm of the transporting device stands empty in its starting position above the playback unit. In that case, because of the U-shaped and thus open configuration of the carrying arm, the playback unit and particularly its playback head are subjected to soiling and to the danger of improper treatment.

SUMMARY OF THE INVENTION

It is the object of the invention to provide a disc player of the above-mentioned type which, with a simple and compact structure, ensures a reliable shield for the disc holder and the desired disc against extraneous influences during transport to and from the playback unit and for the playback unit itself.

This is accomplished by the invention in that the upper face of the movable carrying arm is provided with a covering that completely covers the disc holder and the disc therein.

The measure according to the invention always protects the disc and the disc holder against soiling by dust and the like on its transporting path. At the same time, the covering prevents access to the disc or the disc holder, thus preventing possible damage to the transporting unit. If no disc is being played, the transporting device and the carrying arm are in their starting position directly above the playback unit. In this position the covering of the carrying arm shields the playback unit completely against soiling and improper access, which is of particular significance for the playback head of the playback unit.

To be able to detect, on the one hand, the imprinted identifying data of the selected disc during its transport and, on the other hand, observe its rotary movement during playing of the disc, an advantageous feature of the invention provides for the covering of the carrying arm to be configured as a transparent pane in the region of the disc.

According to an advantageous modification of the subject matter of the invention, the underside of the carrying arm is provided with two parallel holding rails for the disc holder. These rails are spaced at a distance that is slightly less than the width of the disc holder. In this way, the underside of the carrying arm together with the disc holder it carries and the disc disposed therein practically form a plane surface which makes it possible to employ playback units from different manufacturers and thus of different exterior design in the disc player. Since there are no projections or the like at the underside of the carrying arm, they cannot interfere with the downward movement of the carrying arm by bumping against the housing of the playback unit when the disc is placed onto the turntable of the playback unit.

To avoid the empty movement of the transporting device toward the playback unit after the selection of a disc, a further advantageous feature of the invention provides the carrying arm with an associated sensor for monitoring the actual presence of a disc in the disc holder. Preferably, a sensing device for determining the size of the diameter of the disc in the disc holder is associated with the carrying arm.

For monitoring the correct position of the disc holder on the holding rails of the carrying arm of the transporting device, an advantageous modification of the invention associates the middle of the carrying arm with a sensor for monitoring the concentric position of the disc stored in the disc holder relative to the turntable of the playback unit.

Advisably, a sensor for determining the end position of the carrying arm above the playback unit is disposed in the lower portion of the transporting device.

In order to realize a structurally simple arrangement of the disc hold-down member, the cover associated with the carrying arm is provided with an opening that lies in the longitudinal axis of the drive shaft of the turntable of the playback unit into which the disc hold-down member is inserted. Preferably, the disc hold-down member includes a disc hold-down insert equipped with a central magnet and disposed with relatively large play in the opening in the cover. In the rest position of the disc hold-down insert, the magnet cooperates with a magnetizable steel plate that is inserted into the cover closing the opening, and in the operating position of the disc hold-down insert the magnet cooperates with the magnetizable drive shaft of the turntable of the playback unit. As an alternative, it is also possible to manufacture the cover itself of magnetizable steel.

In order to realize a simply constructed and reliably operating extraction device for the transporting device, in which a gripping arm mounted so as to be moved in and out in a reciprocating carriage in the extraction device can be brought into engagement with an associated recess in the disc holder and in which the gripping arm is retained in its extended position by a stationary abutment, an advantageous modification of the invention provides that the gripping arm, if the carriage is in its starting position, is held in its moved-in position by a cam track guide in such a way that, if the carriage moves from its starting position, the cam track guide moves the gripping arm into the moved-out position in which it engages in the recess in the disc holder. Advisably, the cam track guide includes a cam track block that is connected with the gripping arm and a pin that enters into a cam track in the cam track block and is fastened to the upper portion of the transporting device. The cam track in the cam track block is here preferably configured in such a way that, if the carriage moves into its starting position defined by an abutment, the pin initially comes into engagement with the cam track and then, by way of the cam track block, pulls the gripping arm back into its moved-in position in the carriage.

In order to realize a simple guidance for the cam track block and the gripping arm, an advantageous feature of the invention provides that the carriage, which is slidably guided on a supporting rod, is provided on its upper face with two facing flanges that are equipped with openings in which, on the one hand, the cam track block and, on the other hand, the gripping arm are slidably guided. Advisably, the interior of the flange accommodating the gripping arm of the carriage serves as the abutment for the cam track block when the gripping arm is in the extended position.

In order for the carriage to be unable to pivot about the supporting rod, the carriage of a modification of the invention is supported in the region of the gripping arm on a rail that extends parallel to the supporting rod. Preferably, the cam track block of the gripping arm has an associated light barrier for detecting the starting position of the carriage.

For reliable back and forth movement of the carriage, an advantageous modification of the invention provides that the carriage is driven by way of a belt drive and worm gear and by a reversible motor, with a friction coupling being provided between the worm gear and the drive wheel of the toothed belt of the belt drive. The friction coupling permits manual displacement of the carriage.

In order to be able to employ two analogously configured extraction devices for processing two oppositely disposed disc storage magazines with the same transporting device, a further carriage is advisably provided on the supporting rod for two oppositely disposed disc storage magazines. This carriage is driven by way of a further belt drive with worm gear, friction coupling and reversible motor so as to slidably move. In order to actuate the gripping arm of this carriage, the latter is also connected with a cam track block and a correspondingly extending cam track which has a further pin associated with it that is arranged correspondingly at the upper portion of the transporting device.

BRIEF DESCRIPTION OF THE DRAWINGS

The concept on which the invention is based will now be explained in greater detail in the description below of an embodiment that is illustrated in the drawings in which.

DESCRIPTION OF THE PREFERRED EMBODIMENTS

Figure 1:
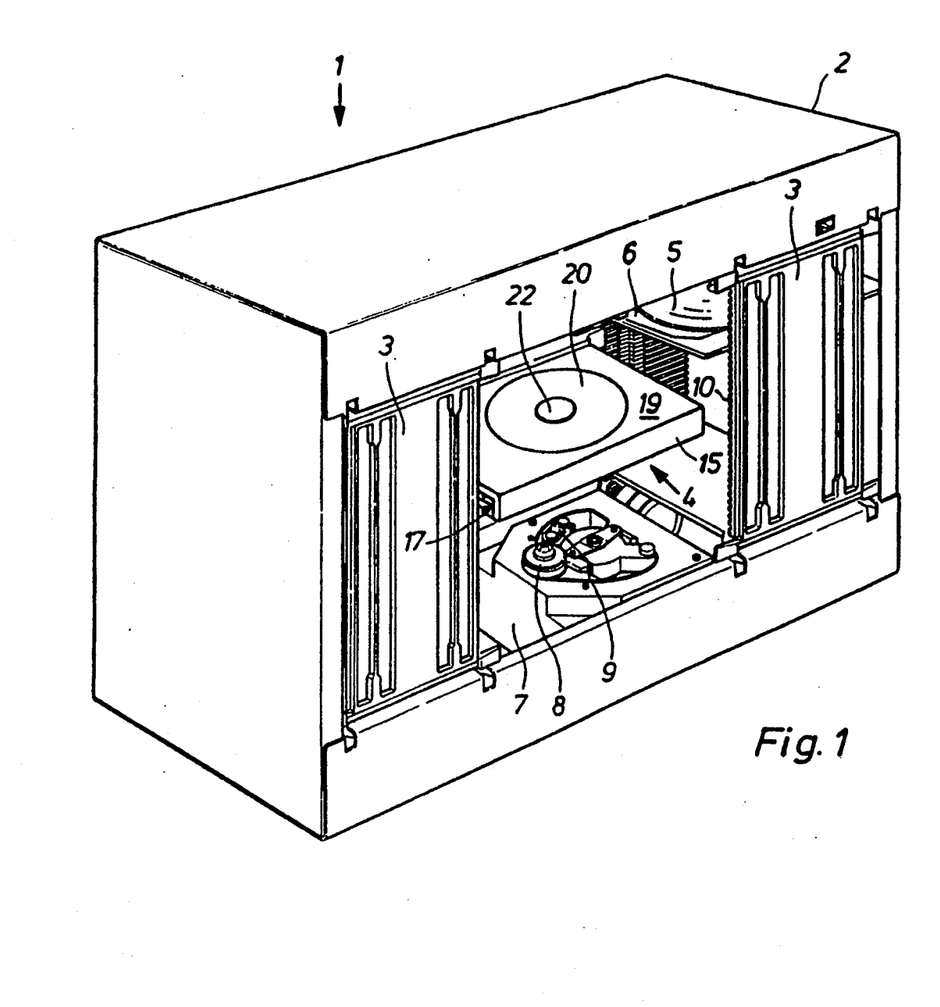
FIG. 1 is a perspective front view of a disc player according to the invention.

The disc player 1 with which informations recorded on discs can be read out and played back optically includes a housing 2 with an associated non-illustrated operating panel provided with various keys, for example, a disc selection key, a disc playback key and a stop key. Exchangeable disc storage magazines 3 are arranged in the sides of housing 2 so as to face one another. In the space between disc storage magazines 3 there is disposed a transporting device 4 that can be moved up and down. It accommodates a disc holder 6 which receives a disc 5. A playback unit 7 including a driven turntable 8 and a pivotal playback head 9 are attached in a stationary manner between and below the two facing disc storage magazines 3. The mutually identically constructed disc storage magazines 3 are each provided with a plurality of superposed storage compartments 10 for storing a corresponding number of disc holders 6, each accommodating one disc 5. In storage compartment 10, the position of disc holder 6 is secured by two facing non-illustrated spring elements which are attached to disc storage magazine 3. In this position, disc holder 6 projects to such an extent over the extraction side of disc storage magazine 3 that it can be gripped by an extraction device 11 that is part of transporting device 4.

Figure 2:
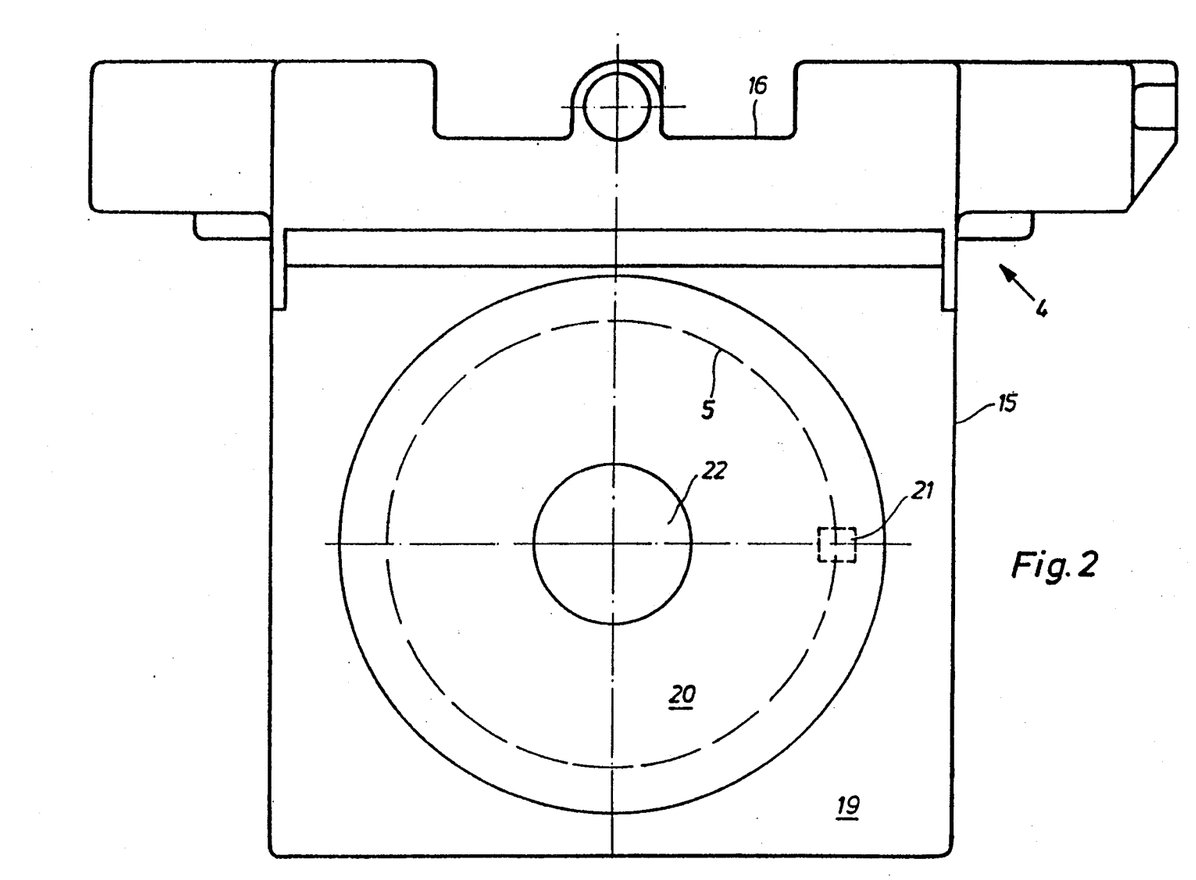
FIG. 2 is a top view to an enlarged scale of the transporting device of the disc player of FIG. 1 with the drive for the up and down movement being omitted.
Figure 3:
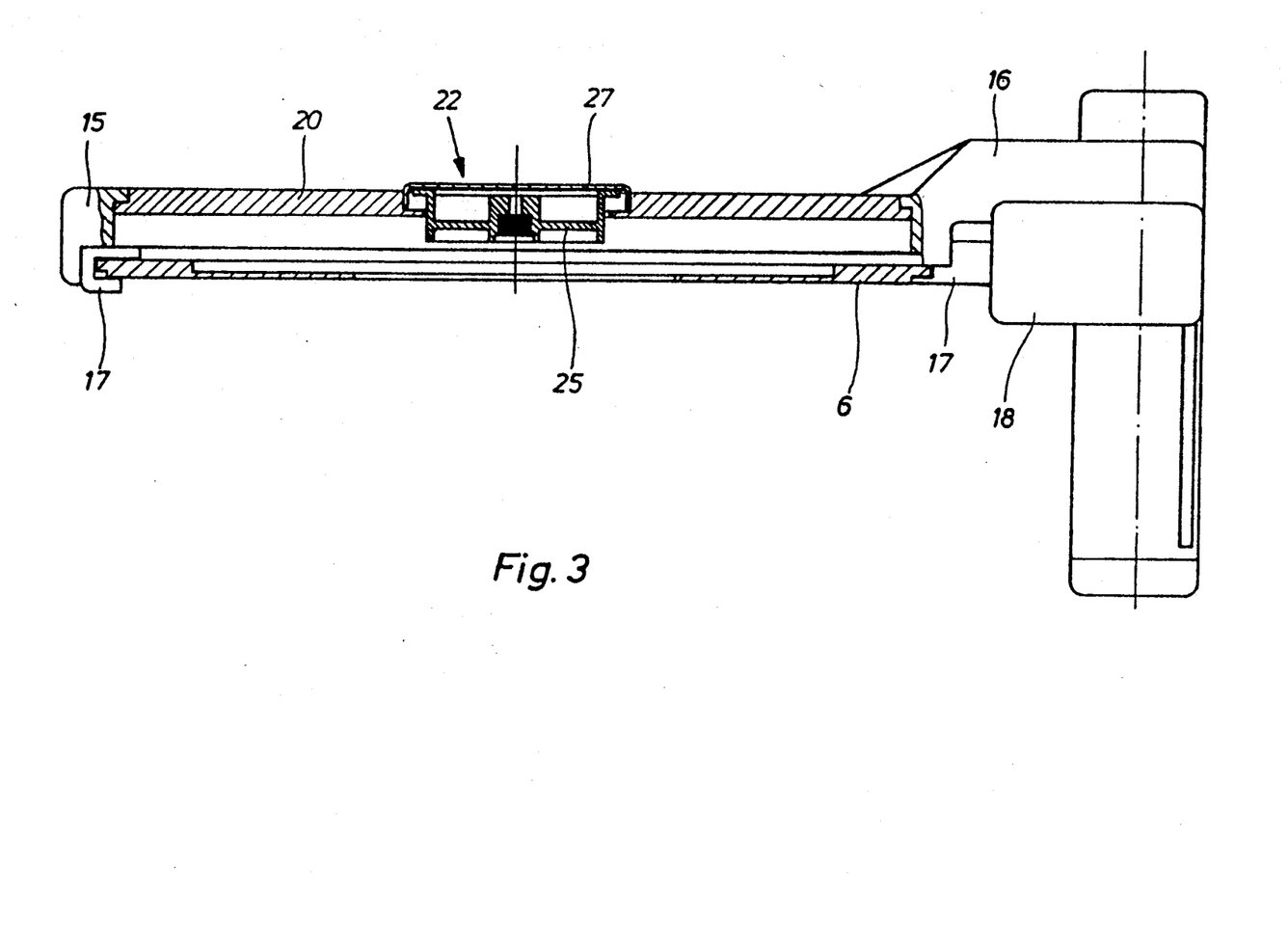
FIG. 3 is a side view, partially in section, of the transporting device according to FIG. 2.

Disc holder 6 is provided with a recess 13 in the front region of the underside of each of its long sides 12. According to the association of transporting device 4 with disc storage magazine 3 and the insertion position of disc holder 6 in storage compartment 10, a gripping arm 14 of extraction device 11 of transporting device 4 is able to engage in one of these recesses 13 in order to transport disc holder 6 to a rectangular carrying arm 15 at the upper portion 16 of transporting device 4. Carrying arm 15 has two associated holding rails 17 at its underside. These holding rails extend in the direction of the long sides 12 of disc holder 6 so as to accommodate the disc holder 6. The distance between the mutually parallel holding rails 17 is somewhat less than the distance between the long sides 12 of disc holder 6 so that disc holder 6 can be received by holding rails 17 and moved in a sliding manner. The holding rail 17 at the free end of carrying arm 15 is fastened directly to the latter while the other holding rail 17 is attached to the lower portion 18 of transporting device 4. Due to this type of support for disc holder 6 in carrying arm 15, disc holder 6 forms a planar surface with the underside of carrying arm 15, thus making it possible to insert a playback unit 7 having any desired exterior configuration into housing 2 since no projections or the like at the underside of carrying arm 15 interfere, by abutting on playback unit 7, with the necessary downward movement of the transporting device when a disc 5 is placed onto turntable 8. The upper face of carrying arm 15 is configured as a closed cover 19 for the disc holder 6 disposed therebelow and its associated disc 5. At the same time, if transporting device 4 is in its starting position shortly above playback unit 7, cover 19 serves as dust protection for playback unit 7. In the region of the disc 5 held by disc holder 6, cover 19 is constructed as a transparent pane 20 to permit observation of disc 5. Pane 20 is provided with a sensor 21 for actually checking for the presence of a disc 5 in the plate holder 6 picked up by the carrying arm 15 of transporting device 4. If sensor 21 does not detect a disc in disc holder 6, transporting device 4 immediately returns this disc holder 6 to the associated storage compartment 10 of disc storage magazine 3.

Figure 4:
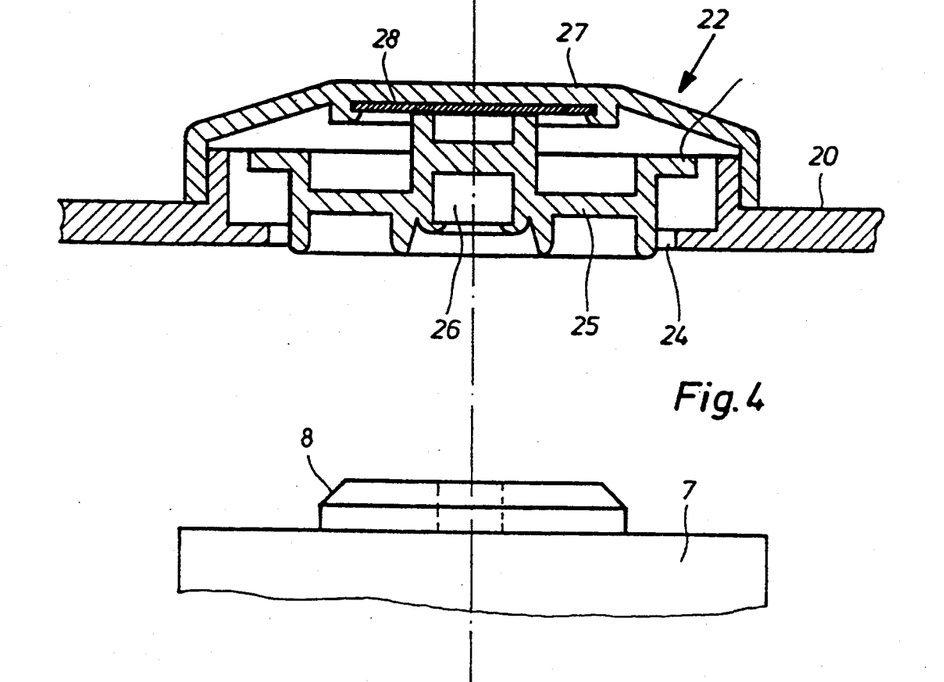
FIG. 4 is a detail view to an enlarged scale of the disc hold-down member of the transporting device of FIG. 3 in an alternative embodiment with associated playback unit.
Figure 5:
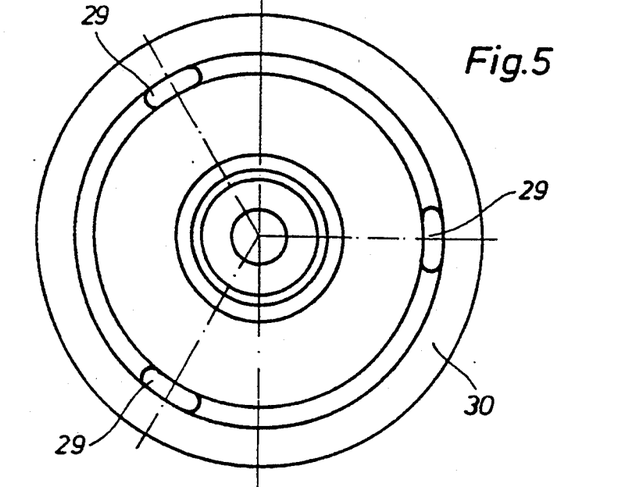
FIG. 5 is a partial bottom view of the disc hold-down member of FIG. 4.
Figure 6:
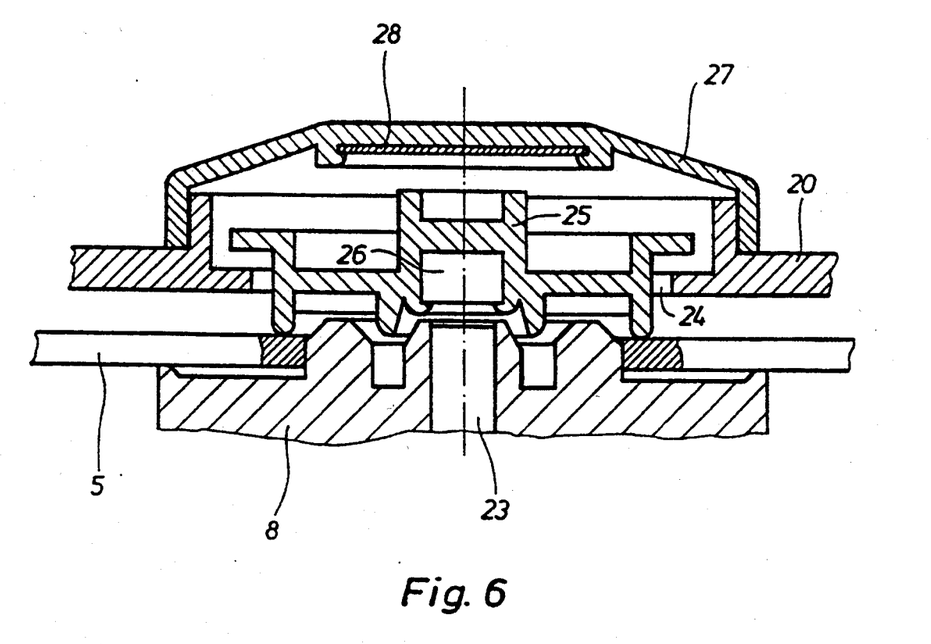
FIG. 6 is a view of the disc hold-down member of FIG. 4 in the operating position.
Figure 7:
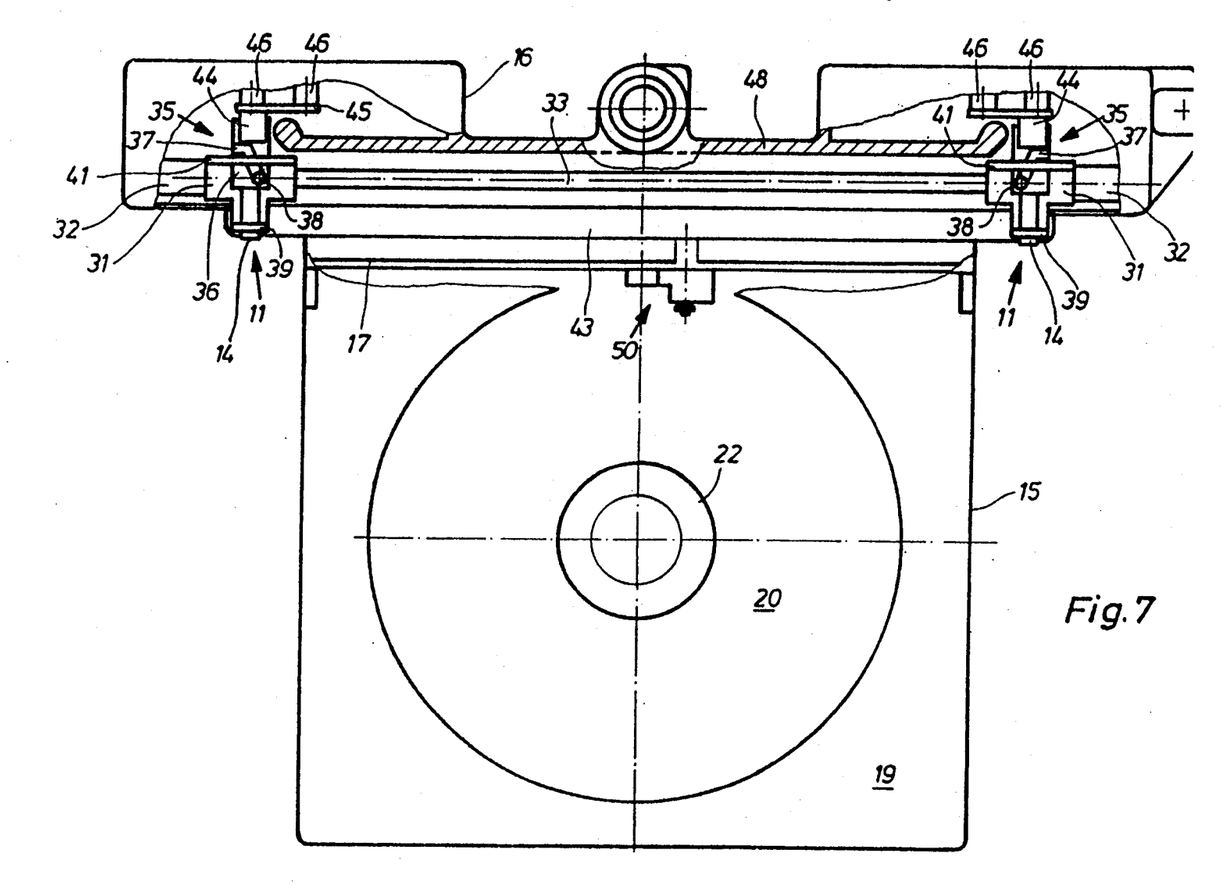
FIG. 7 is a partially sectional view of the transporting device of FIG. 2.
Figure 8:
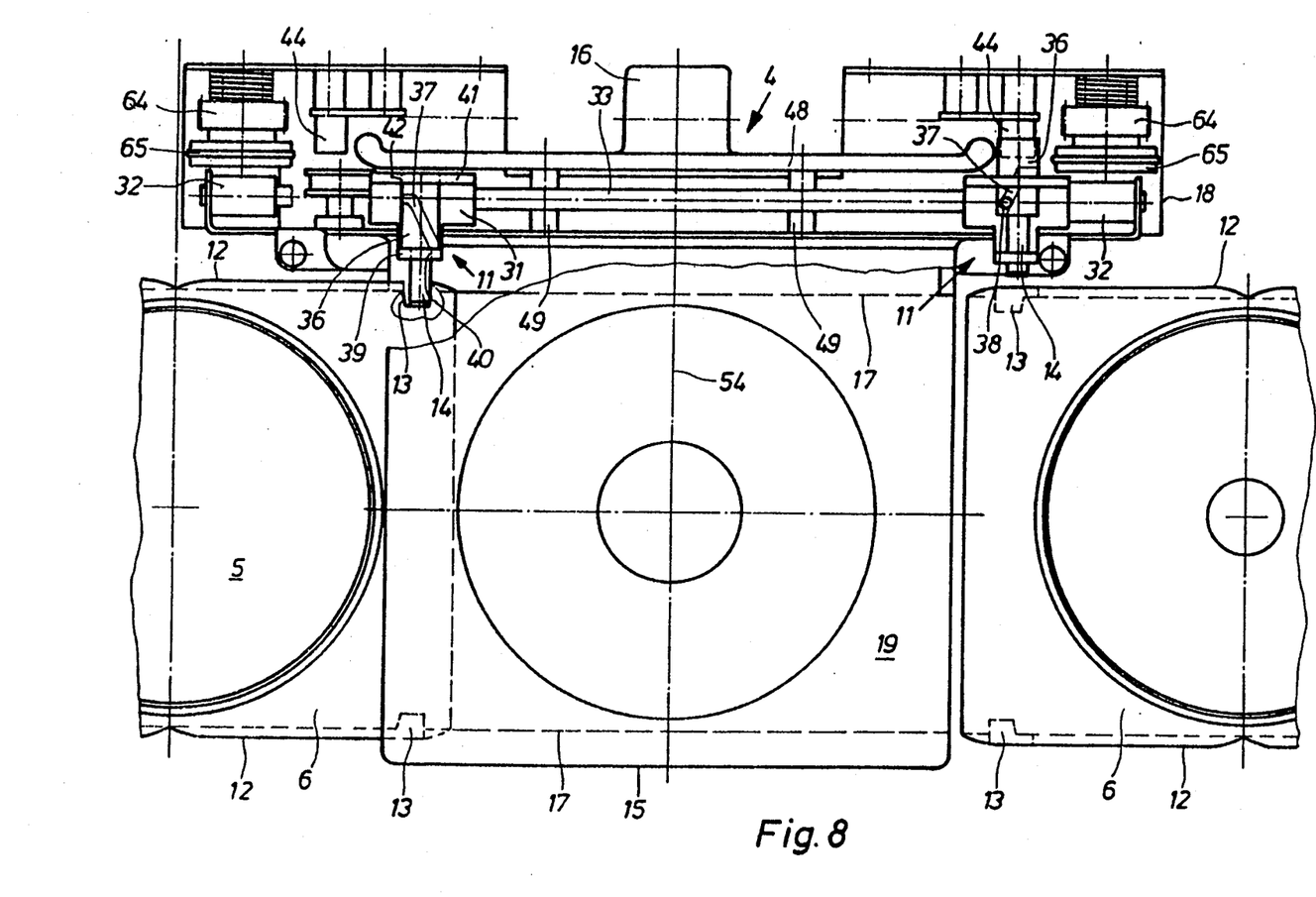
FIG. 8 is a view of the transporting device of FIG. 7 with associated disc holders on its sides in the operational position.

A disc hold-down member 22 is inserted concentrically into pane 20 of carrying arm 15 of transporting device 4. A disc hold-down insert 25 of disc hold-down member 22 extends with a relatively large play through an opening 24 in pane 20 that lies in the longitudinal axis of the drive shaft of turntable 8 of playback unit 4. Disc hold-down insert 25 holds a magnet 26 in its center which faces a magnetizable steel plate that is clipped into the underside of a plastic lid 27 covering opening 24. Due to the action between magnet 26 and steel plate 28, disc hold-down insert 25, in its rest position, lies against steel plate 28. If transporting device 4 and disc hold-down member 22 move into their end position above turntable 8, the magnetic shunt between magnet 26 and the magnetizable drive shaft 23 of turntable 8 becomes greater than the magnetic shunt between magnet 26 and the magnetizable steel plate 28, thus displacing disc hold-down insert 25 downwardly out of opening 24 so that three knobs 29 that are disposed on its underside in an arrangement mutually offset by 120° push disc 5 onto turntable 8. As soon as disc hold-down member 22 is moved out of this operating position again, the magnetic flux between magnet 26 and steel plate 28 causes disc hold-down insert 25 to go back to its rest position. An annular shoulder 30 of disc hold-down insert 25 prevents disc hold-down insert 25 from being pulled out of opening 24 in pane 20 of carrying arm 15. Instead of steel plate 28, lid 27 may also be made of a magnetizable material.

The gripping arm 14 of extraction device 11 of transporting device 4 is mounted so as to move in and out in a carriage 31. By means of a belt drive 34 carriage 31 is thus able to move back and forth in the lower portion 18 on a supporting rod 33 equipped with abutments 32. In the starting position, carriage 31 lies against abutment 32 and gripping arm 14 is held in its moved-in position in carriage 31 by way of an associated cam track guide 35. Cam track guide 35 is composed of a cam track block 36 which is connected with gripping arm 14 and is provided with a cam track 37 into which engages a pin 38 that is fastened to upper portion 16. On its upper face, carriage 31 is provided with a frontal flange 39 equipped with an opening 40 through which extends gripping arm 14 in a manner enabling it to slide. The carriage further includes a rear flange 41 provided with an opening 42 through which extends cam track block 36 in a manner enabling it to slide. The interior face of front flange 39 serves as an abutment for cam track block 36 when gripping arm 14 is in the extended position. In the region of gripping arm 14, the underside of carriage 31 is supported on a rail 43 that is attached to lower portion 18 parallel to support rod 33. In the starting position of carriage 31, the portion of cam track block 36 that projects beyond the rear flange 41 of carriage 31 engages in a light barrier 44 that is configured as a fork coupler to thus monitor this position of carriage 31. Light barrier 44 is attached to a printed circuit board 45 which is fastened to lower portion 18 by way of holders 46. If carriage 31 moves out of its starting position away from abutment 32, cam track block 36 moves, due to the interaction between the stationary pin 38 and the correspondingly configured cam track 37, in the direction of the front flange 39 of carriage 31, with gripping arm 14 simultaneously moving out of carriage 31 and coming into engagement with the recess 13 of the disc holder 6 facing it. Shortly before pin 38 leaves cam track 37, the rear face 47 of cam track block 36 comes to lie against an abutment rail 48 formed at upper portion 16 in order to prevent gripping arm 14 from sliding out of its moved-out position. Abutment rail 48 is connected with the lower portion by way of two holders 49. In order to ensure an accurate alignment of the disc 5 carried by carriage 31 into carrying arm 15 relative to the turntable 8 of playback unit 7, a sensor 50 is attached to the frontal face of lower portion 16 in order to determine the centered position of disc holder 6 in carrying arm 15. Sensor 50 includes a two-armed lever 52 which is pivotally held in a bearing 51 and whose one arm 53 cooperates, by way of a knob 55 formed at it in the center axis 54 of carrying arm 15 with a central knob 56 at the underside of disc holder 6 while its other arm 58 which is charged by a tension spring 57, cooperates by way of an angled portion 59 at its end with a fork coupler 60 accommodated in lower portion 18. Next to fork coupler 60, there is another sensor 61 configured as a fork coupler into which engages a web disposed behind playback unit 7 so as to determine the end position of carrying arm 15 above playback unit 7.

Figure 9:
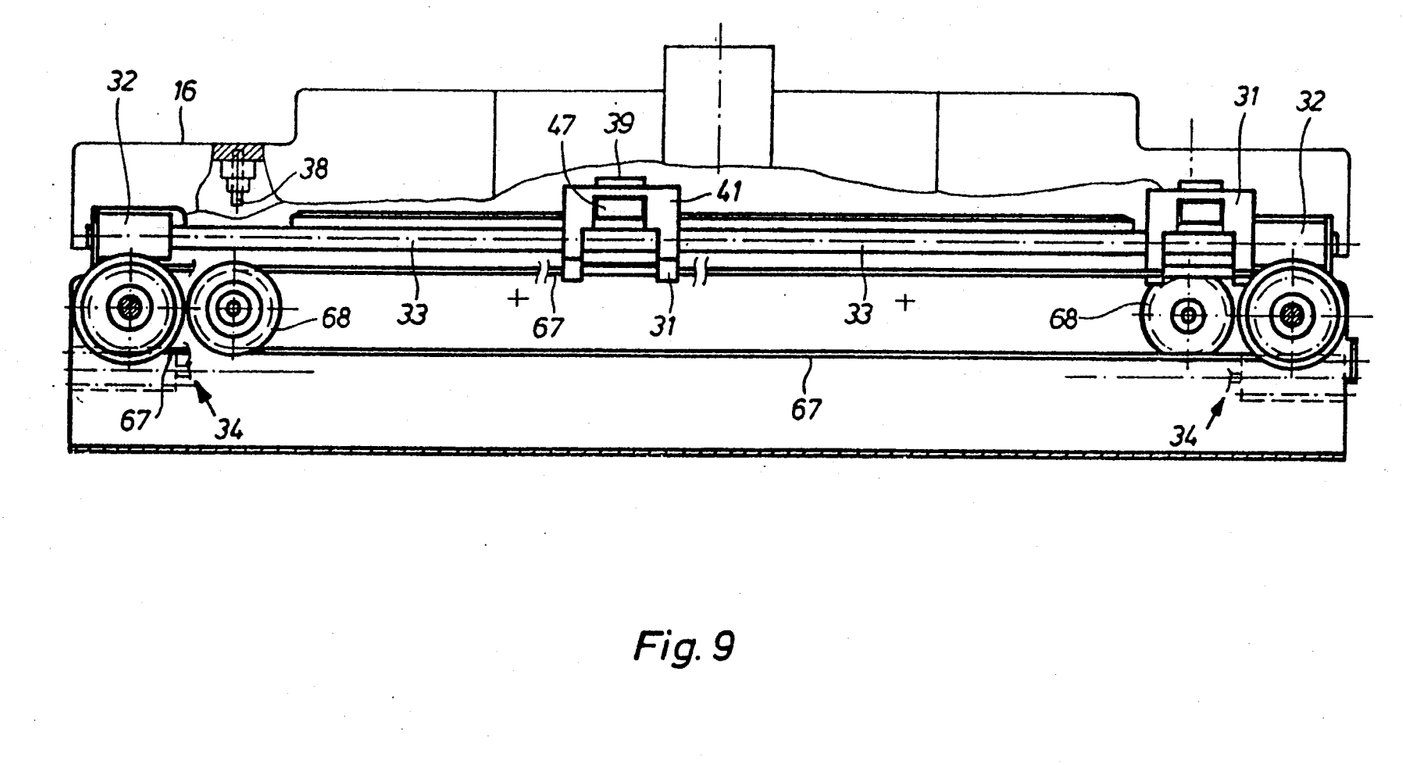
FIG. 9 is a partially sectional rear view of the transporting device of FIG. 8.
Figure 10:
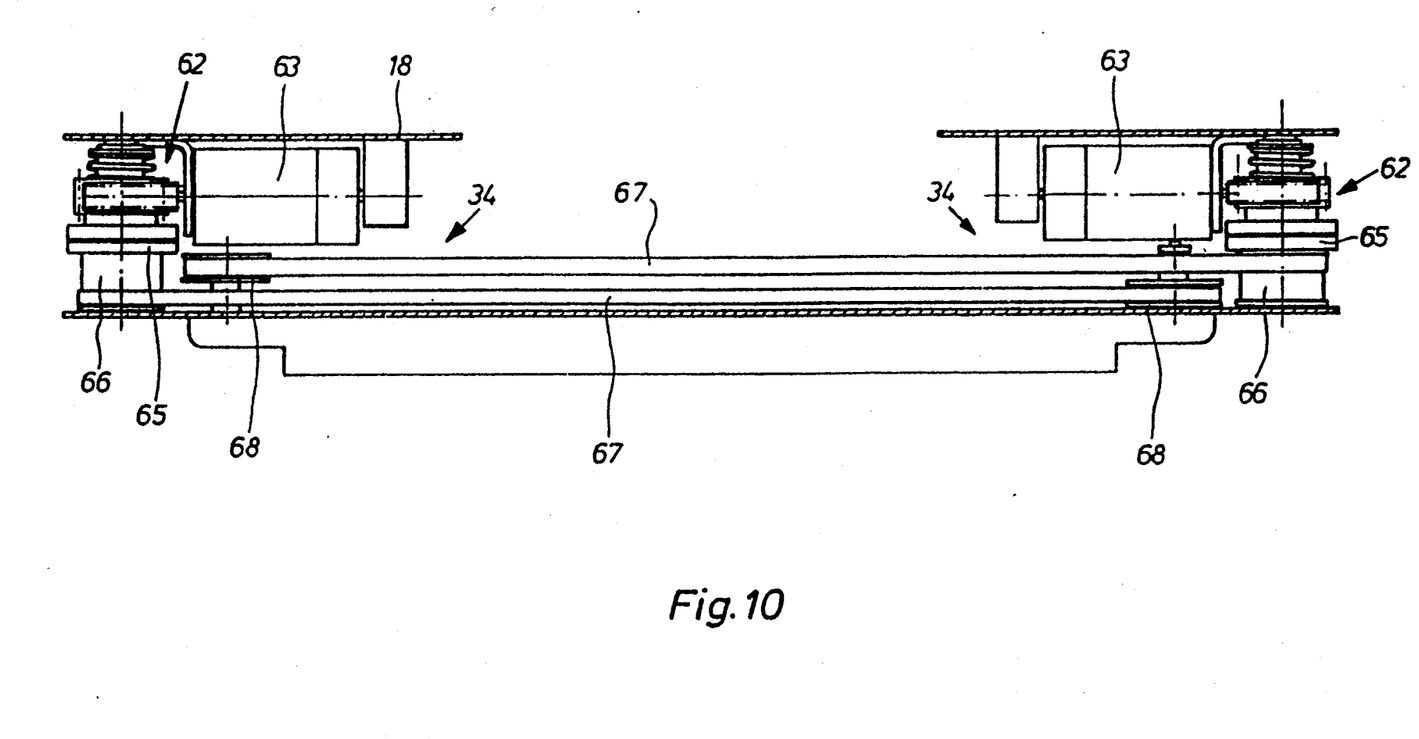
FIG. 10 is a cross-sectional view of the bottom portion of the transporting device of FIG. 9.
Figure 11:
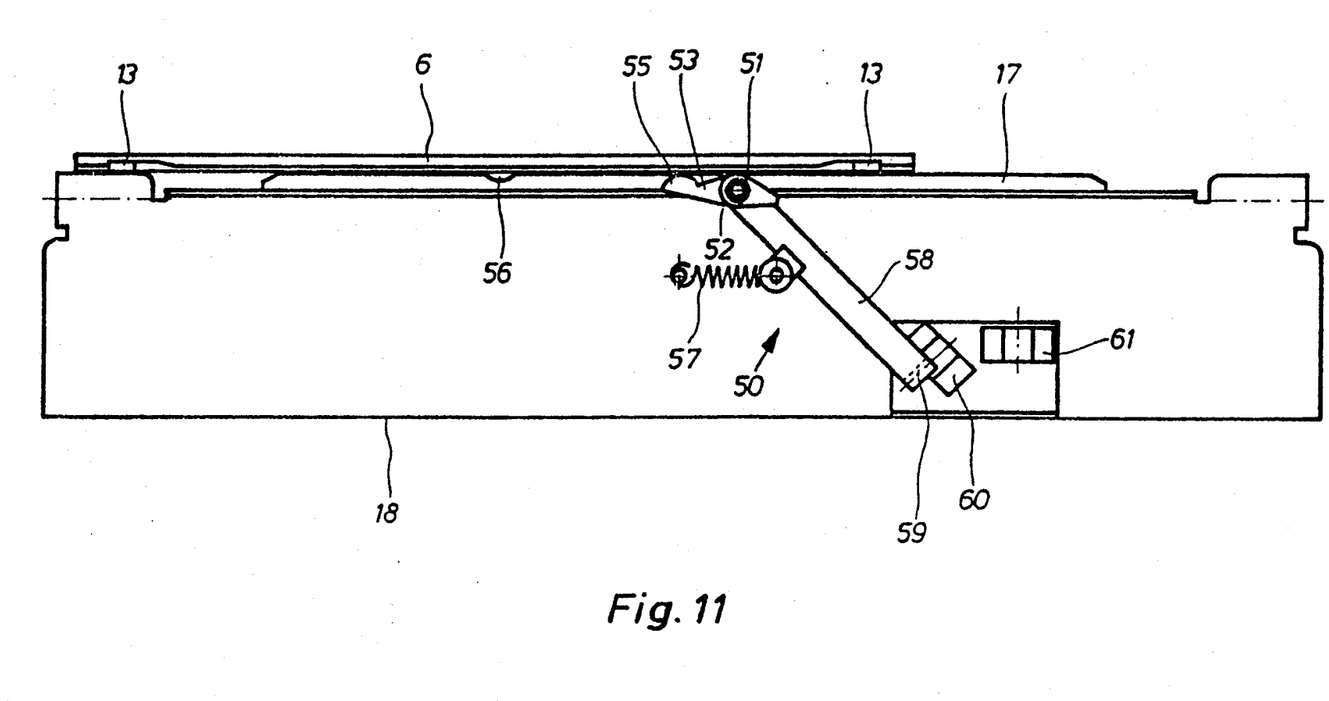
FIG. 11 is a front view of the illustration of FIG. 10.

The belt drive 34 for moving carriage 31 includes a worm gear 62 and a reversible motor 63. The worm wheel 64 of worm gear 62 is connected by way of a spring-tensioned friction coupling 65 with the drive wheel 66 for the toothed belt 67 of belt drive 34. The endless toothed belt 67 is guided over a reversal roller 68 provided at lower portion 18 at an appropriate distance from drive wheel 66 and is fastened to carriage 31. The left carriage 31 in FIG. 9 is connected with the rear toothed belt 67 while the right carriage 31 is coupled to the front toothed belt 67. If a disc holder 6 is taken out of a storage compartment 10 by means of the carriage 31 of the one extraction device 11, the carriage 31 of the other extraction device 11 serves as an abutment, if the disc holder is in its end position on the holding rails 17 of the carrying arm 15 of transporting device 4 in which the disc 5 stored in disc holder 6 is concentric with the turntable 8 of playback unit 7. Sensor 50 serves to monitor this position of disc 5.

All motion sequences of disc player 1 are controlled and monitored by a central control unit. If, for example, a disc 5 stored in the right disc storage magazine 3 has been selected by means of the keys on the operator panel, transporting device 4 moves out of its starting position above playback unit 7 to a height which coincides with the height of the storage compartment 10 of disc storage magazine 3 in which the disc holder 6 holding the selected disc 5 is disposed. Then the extraction device 11 of transporting device 4 facing disc storage magazine 3 is put into action so that initially, due to the action of cam track guide 35, the gripping arm 14 of carriage 31 engages in the recess 13 of disc holder 6 facing it and then the movement of carriage 31 to its abutment on the other carriage 31 causes disc holder 6 and disc 5 to be transported from storage compartment 10 to the holding rails 17 of carrying arm 15 of transporting device 4. As soon as disc holder 6 has reached its final position on holding rails 17, which is being monitored by sensor 50, transporting device 4 moves in the direction of playback unit 7. While releasing disc 5 from disc holder 6, the central region of disc 5 is placed onto turntable 8. At the same time, in this end position of transporting device 4, the magnetic attraction between magnet 26 and the drive shaft 23 of turntable 8 causes the disc hold-down insert 25 of disc hold-down member 22 to be pressed against the upper face of disc 5. If turntable 8 in playback unit 7 is caused to rotate so that the information stored on disc 5 is read out optically by playback head 9 to then be played back by way of appropriate loudspeakers. At the end of the information read-out from disc 5, the latter is returned by transporting device 5 in an analogous manner to its associated storage compartment 10. Then transporting device 4 moves empty into its end position above playback unit 7 in which the cover 19 of carrying arm 15 protects, in particular, playback head 9 of playback unit 7 against soiling and improper access.

The above description of the drawings clarifies the details of the structure and use of the disc player according to the invention. However, it is understood by the person skilled in the art that the basic concept of the present invention can be put to much broader use and is not limited to the embodiment under specific consideration here.

I claim:

1. A disc player, comprising:
   (A) a playback unit including a turntable having a driveshaft;
   (B) at least one disc storage magazine having a plurality of storage compartments arranged in a stack and a plurality of superposed disc holders stored therein, each disc holder accommodating one disc; and
   (C) a transporting device movable in a direction of the stack for moving a desired disc and respective disc holder back and forth between said storage compartment and said playback unit and including:
      (1) a horizontally displaceable extraction device for extracting the respective disc holders from said magazine, comprising:
         a support rod;
         a reciprocating carriage slidably guided on said support rod, and having an upper portion and two facing flanges attached to the upper portion, each flange having an opening;
         a retractable gripping arm mounted to said carriage and being extendable for engaging with a recess in the respective disc holders, said gripping arm being slidably guided within the opening of one of said flanges;
         a cam track guide having a cam track block connected with said gripping arm, and a pin fastened to an upper portion of said transporting device, said pin being engagable with a cam track in said cam track block, said cam track guide maintaining said gripping arm in a retracted position when said carriage is in a starting position and for moving said gripping arm into an extended position when said carriage is moved from said starting position, said cam track block being slidably guided within the opening of the other one of said flanges; and
         a stationary abutment for maintaining said gripping arm in said extended position;
      (2) a disc hold-down member for pressing the desired disc to be played onto said turntable; and
      (3) a movable carrying arm for accommodating the respective disc holders, said movable carrying arm having an upper face including a cover for gripping over a respective one of the disc holders and disc therein, said cover having an opening essentially coaxial with a longitudinal axis of said drive shaft, said disc hold-down member being insertable into said opening.

2. A disc player according to claim 1, wherein, said cover of said carrying arm, in a region of the disc, comprises a transparent pane.

3. A disc player according to claim 1, wherein said drive shaft is magnetizable, the disc hold-down member includes a disc hold-down insert that is positioned with play in the opening of the cover and is provided in its center with a magnet which, in a rest position of the disc hold-down insert cooperates with a magnetizable steel plate that is inserted into a lid that closes the opening and, in an operating position of the disc hold-down insert, cooperates with the magnetizable drive shaft of the turntable of the playback unit.

4. A disc player according to claim 1, wherein the carrying arm has an underside comprising two parallel holding rails for the disc holder, said holding rails being positioned at a distance that is greater than a width of the disc holder.

5. A disc player according to claim 1, wherein the carrying arm has an associated sensor for monitoring the actual presence of a disc in the disc holder.

6. A disc player according to claim 1, wherein the carrying arm has an associated sensing device for determining the size of a diameter of the disc in the disc holder.

7. A disc player according to claim 1, wherein the center of the carrying arm has an associated sensor for monitoring a concentric position of the disc stored in the disc holder relative to the turntable of the playback unit.

8. A disc player according to claim 1, further comprising a sensor for determining an end position of the carrying arm above the playback unit, said sensor being positioned in a lower portion of the transporting device.

9. A disc player according to claim 1, wherein, the pin initially engages the cam track when said carriage is moved towards the starting position to thereafter retract the gripping arm to a position within the carriage.

10. A disc player according to claim 1, wherein one flange has an interior surface that abuts the cam track block when the gripping arm is in the extended position.

11. A disc player according to claim 1, wherein the carriage is driveable by a belt drive including a worm gear, a drive wheel, a reversible motor, and a friction coupling provided between the worm gear and the drive wheel.

12. A disc player according to claim 1, wherein said at least one disc storage magazine comprises two facing disc storage magazines, said disc player further comprising a further carriage slidably guided to move on the support rod and being driven by a belt drive equipped with worm gear, friction coupling and reversible motor, said further carriage having a further actuatable gripping arm connected with a further cam track block that is equipped with a correspondingly extending cam track associated with a further pin that is correspondingly positioned at the upper portion of the transporting device.

13. A disc player, comprising:
(A) a playback unit including a turntable having a driveshaft;
(B) at least one disc storage magazine having a plurality of storage compartments arranged in a stack and a plurality of superposed disc holders stored therein, each disc holder accommodating one disc; and
(C) a transporting device movable in a direction of the stack for moving a desired disc and respective disc holder back and forth between said storage compartment and said playback unit, and including:
(1) a horizontally displaceable extraction device for extracting the respective disc holders from said magazine, comprising:
a support rod;
a rail extending parallel to said support rod;
a retractable gripping arm being extendable for engaging with a recess in the respective disc holders;
a reciprocating carriage having said retractable gripping arm mounted thereto, and being supported by said rail in a region of said gripping arm;
a cam track guide having a cam track block connected with said gripping arm, and a pin fastened to an upper portion of said transporting device, said pin being engagable with a cam track in said cam track block, said cam track guide maintaining said gripping arm in a retracted position when said carriage is in a starting position and for moving said gripping arm into an extended position when said carriage is moved from said starting position; and
a stationary abutment for maintaining said gripping arm in said extended position;
(2) a disc hold-down member for pressing the desired disc to be played onto said turntable; and
(3) a movable carrying arm for accommodating the respective disc holders, said movable carrying arm having an upper face including a cover for gripping over a respective one of the disc holders and disc therein, said cover having an opening essentially coaxial with a longitudinal axis of said drive shaft, said disc hold-down member being insertable into said opening.

14. A disc player according to claim 13, wherein said cover of said carrying arm comprises a transparent pane in a region of the disc.

15. A disc player, comprising:
(A) a playback unit including a turntable having a driveshaft;
(B) at least one disc storage magazine having a plurality of storage compartments arranged in a stack and a plurality of superposed disc holders stored therein, each disc holder accommodating one disc; and
(C) a transporting device movable in a direction of the stack for moving a desired disc and respective disc holder back and forth between said storage compartment and said playback unit, and including:
(1) a horizontally displaceable extraction device for extracting the respective disc holders from said magazine, comprising:
a reciprocating carriage;
a retractable gripping arm mounted to said carriage and being extendable for engaging with a recess in the respective disc holder;
a cam track guide having a cam track block connected with said gripping arm, and a pin fastened to an upper portion of said transporting device, said pin being engagable with a cam track in said cam track block, said cam track guide maintaining said gripping arm in a retracted position when said carriage is in a starting position and for moving said gripping arm into an extended position when said carriage is moved from said starting position;
a light barrier associated with said cam track block for detecting the starting position of the carriage; and
a stationary abutment for maintaining said gripping arm in said extended position;
(2) a disc hold-down member for pressing the desired disc to be played onto said turntable; and
(3) a movable carrying arm for accommodating the respective disc holders, said movable carrying arm having an upper face including a cover for gripping over a respective one of the disc holders and disc therein, said cover having an opening essentially coaxial with a longitudinal axis of said drive shaft, said disc hold-down member being insertable into said opening.

16. A disc player according to claim 15, wherein said cover of said carrying arm comprises a transparent pane in a region of the disc.

* * * * *